US006905702B1

(12) United States Patent
Kaufman

(10) Patent No.: US 6,905,702 B1
(45) Date of Patent: *Jun. 14, 2005

(54) METHODS FOR REGULATING BLOOD GLUCOSE AND APPETITE SUPPRESSION IN TYPE 2 DIABETICS

(75) Inventor: Francine R. Kaufman, Los Angeles, CA (US)

(73) Assignee: Children's Hospital Los Angeles, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,378

(22) Filed: Nov. 7, 2000

Related U.S. Application Data

(60) Provisional application No. 60/164,043, filed on Nov. 8, 1999.

(51) Int. Cl.[7] ...................... A61K 47/00; A61K 31/715
(52) U.S. Cl. ........................................ 424/439; 514/60
(58) Field of Search ............................. 424/439; 514/60

(56) References Cited

U.S. PATENT DOCUMENTS

| | | | | |
|---|---|---|---|---|
| 5,605,893 A | * | 2/1997 | Kaufman | 514/60 |
| 5,843,921 A | * | 12/1998 | Kaufman | 514/60 |
| 5,866,555 A | | 2/1999 | Bell et al. | 514/60 |
| 5,902,797 A | | 5/1999 | Bell et al. | 514/54 |
| 6,156,738 A | | 12/2000 | Bell et al. | 514/60 |
| 6,339,076 B1 | * | 1/2002 | Kaufman | 514/60 |

FOREIGN PATENT DOCUMENTS

| | | | | |
|---|---|---|---|---|
| EP | 0749697 A1 | | 12/1996 | ............ A23P/1/08 |
| WO | WO 96/31129 | * | 10/1996 | |
| WO | WO 98/17286 | * | 4/1998 | |

OTHER PUBLICATIONS

Kaufman et al., "Evaluation of a snack bar containing uncooked cornstarch in subjects with diabetes," abstract, http://www.extendbarworks.com/pages/health_clinical.asp Date of access Sep. 24, 2003.

Dyer–Parziale, "The effect of extend bar containing uncooked cornstarch on night–time glycemic excursion in suspects with type 2 diabetes," abstract, http://www.extend-barworks.com/pages/health_clinical.asp Date of access Sep. 24, 2003.

Sussman et al., "A study to assess the efficacy of Extend Bar as an appetite suppressant in males and females. A crossover study in moderately overweight subjects with BMI 2731," abstract, http://www.extendbarworks.com/pages/health_clinical.asp Date of access Sep. 24, 2003.

Kaufman et al., "Use of uncooked cornstarch to avert nocturnal hypoglycemia in children and adolescents with type 1 diabetes," abstract, http://www.extendbarworks.com/pages/health_clinical.asp Date of access Sep. 24, 2003.

Kaufman et al., "A randomized, blinded trial of uncooked cornstarch to diminish nocturnal hypoglycemia at Diabetes Camp," abstract, http://www.extendbarworks.com/pages/health_clinical.asp Date of access Sep. 24, 2003.

International Search Report, PCT/US00/30731; Date of Mailing: Feb. 21, 2001.

* cited by examiner

Primary Examiner—Thurman K. Page
Assistant Examiner—Humera N. Sheikh
(74) Attorney, Agent, or Firm—Myers Bigel Sibley & Sajovec, P.A.

(57) ABSTRACT

Methods are disclosed for treating a patient with Type 2 diabetes to decrease hypoglycemic episodes and/or to diminish fluctuations in blood glucose outside of the normal range, comprising administering to said patient, in a therapeutically-effective amount, a food composition that includes a slowly absorbed complex carbohydrate such as uncooked cornstarch. Further disclosed is a method of suppressing appetite in a patient with Type 2 diabetes comprising administering to the subject, in an effective appetite suppressing amount, a food composition that includes a slowly absorbed complex carbohydrate such as uncooked cornstarch. In preferred embodiments, the food composition is in the form of a bar.

13 Claims, 1 Drawing Sheet

METHODS FOR REGULATING BLOOD GLUCOSE AND APPETITE SUPPRESSION IN TYPE 2 DIABETICS

RELATED APPLICATION INFORMATION

This application claims the benefit of United States Provisional Application No. 60/164,043 filed Nov. 8, 1999, which is incorporated by reference herein in its entirety.

FIELD OF THE INVENTION

The present invention concerns nutritional supplements or food compositions that are useful for suppressing appetite, reducing fluctuations in blood glucose levels, and diminishing the incidence of hypoglycemic and hyperglycemic episodes in subjects with Type 2 diabetes mellitus.

BACKGROUND OF THE INVENTION

Increased longevity in the human population and increased costs of health care have generated considerable interest in alternatives to conventional therapies. Drug therapies are considered a desirable alternative to surgical treatments whenever possible because of the cost savings involved. However, drug therapy can itself become expensive. As a result, there is a need for still other approaches, such as nutritional therapies, for various disorders.

U.S. Pat. Nos. 5,843,921 and 5,606,893 to Kaufman describe a therapeutic food composition that contains a slowly digested complex carbohydrate, particularly uncooked cornstarch, useful for diminishing blood sugar fluctuations in diabetic patients, and particularly as a night time snack food.

U.S. Pat. No. 5,866,555 to Bell et al. describes a diabetic supplement bar that preferably contains uncooked cornstarch.

U.S. Pat. No. 5,902,797 to Bell et al. describes a nutritional supplement bar used to treat appetite suppression and combat weight loss. Controlling glycemic excursion in subjects with Type 2 diabetes mellitus is an important goal to limit the devastating long-term complications of this disease (The Diabetes Control and Complication Trial Research Group, (1993) *N. Engl. J. Med.* 329:977; UKPDS Group, (1998) Lancet 352:837). One strategy which has been shown to effectively limit glycemic excursion in patients with Type 1 diabetes has been the use of a snack bar containing uncooked cornstarch (Kaufman et al., (1996) *J. Diabetes Complications* 10:84; Kaufman et al., (1995) *Diabetes Res. Clin. Pract.* 30:205; Kaufman et al., (1997) *Diabetes Res. Clin. Pract.* 35:27)—a complex carbohydrate that is slowly absorbed from the gastrointestinal track over a 6–9 hour period (Chen et al., (1984) *N. Engl. J. Med.* 310:1721; Lozano et al., (1990) *Am. J. Clin. Nutr.* 52:667). Kaufman et al. showed a decrease in the incidence of hypoglycemia at midnight and in the morning after the ingestion of a snack bar containing uncooked cornstarch compared to a placebo bar with the same grams of carbohydrate (Kaufman et al., (1996) *J. Diabetes Complications* 10:84; Kaufman et al., (1995) *Diabetes Res. Clin. Pract.* 30:205; Kaufman et al., (1997) *Diabetes Res. Clin. Pract* 35:27). Of equal importance, there was no increase in observed hyperglycemia after ingesting the cornstarch snack bar.

Accordingly, there is a need in the art for improved methods of treating patients with Type 2 diabetes, in particular, to regulate blood glucose levels. There is a further need in the art for methods of suppressing appetite in subjects with Type 2 diabetes, e.g., to achieve weight loss as part of a therapeutic regime.

SUMMARY OF THE INVENTION

The present invention is based, in part, on the finding that the food compositions described herein may be used in methods of treating Type 2 diabetic patients to assist in maintaining normoglycemia and to reduce blood glucose fluctuations (i.e., hypoglycemic and/or hyperglycemic episodes). The food compositions may further be employed to suppress appetite (e.g., as part of a weight loss program) for patients with Type 2 diabetes, for whom weight loss or weight control is often a part of the therapeutic regimen.

The investigations described herein were carried out to determine the effects of ingesting a snack bar containing uncooked cornstarch (Extend Bar®, Clinical Products, Limited, Key Biscayne, Fla.) on nocturnal glycemic excursion in 28 adults (ages 22–78 years) with Type 2 diabetes mellitus (mean HbA1c 8.21±1.28%). Thirteen subjects were treated with oral agents, eight with a combination of insulin and oral agents, and seven with insulin alone. Subjects ingested the study bar (Extend Bar®, containing 30 grams of total carbohydrate, including 5 grams of uncooked cornstarch, 3 grams protein, and 3 grams fat) for 3 evenings followed by a placebo bar for 3 evenings (30 grams of total carbohydrate, 3 grams protein, and 3 grams fat), or vice versa. Pre-snack before bedtime, midnight and before breakfast finger stick blood glucose levels were compared to determine the incidence of hypoglycemia (<60 mg/dL), hyperglycemia (>250 mg/dL), and to calculate any differences in the group's mean blood glucose levels when ingesting the study versus the placebo bar. There were no episodes of hypoglycemia or hyperglycemia. The mean blood glucose levels pre-snack at bedtime were nearly identical (Extend Bar® value 117.5±45.6 mg/dL; placebo bar value 117.3±40.0 mg/dL; p=0.977), and lower at midnight and before breakfast on the Extend Bar® nights compared to the placebo bar nights (Extend Bar®, midnight value 127.9±31.0 mg/dL; placebo bar midnight value 148.2±32.1 mg/dL; p=0.0001; Extend Bar® breakfast value 114.2±15.8 mg/dL; placebo bar breakfast value 158.49±30.3 mg/dL; p<0.0001). These data indicate that ingesting Extend Bar® containing uncooked cornstarch as the nighttime snack reduced the frequency of nocturnal and morning hyperglycemia in subjects with Type 2 diabetes.

Accordingly, one aspect of the present invention are methods of treating a patient with Type 2 diabetes to decrease hypoglycemic episodes and/or to diminish fluctuations in blood glucose outside of the normal range, comprising administering to said patient, in a therapeutically-effective amount, a food composition that includes a slowly absorbed complex carbohydrate such as uncooked cornstarch.

As a further aspect, the present invention provides a method of suppressing appetite in a patient with Type 2 diabetes in need thereof. The method comprises administering to the subject, in an effective appetite suppressing amount, a food composition that includes a slowly absorbed complex carbohydrate such as uncooked cornstarch.

In preferred embodiments, a food composition or nutritional supplement useful for carrying out the foregoing methods typically comprises:

(a) about 10 to 75 percent by weight of slowly absorbed complex carbohydrate;

(b) about 10 to 40 percent by weight of rapidly absorbed complex carbohydrate;

(c) about 2 to 40 percent by weight of protein;

(d) about 2 to 40 percent by weight of fat; and (e) at least one sweetening agent in an amount effective to sweeten the food composition.

In other embodiments, the food composition or nutritional supplement comprises about 20–50 grams of nutrients including about 5–15 grams of uncooked cornstarch.

Numerous other additives, supplements, and the like can also be included in the composition, as desired.

The foregoing and other objects and aspects of the present invention are explained in more detail in the drawings herein and the specification set forth below.

DETAILED DESCRIPTION OF PREFERRED EMBODIMENTS

Figure 1:
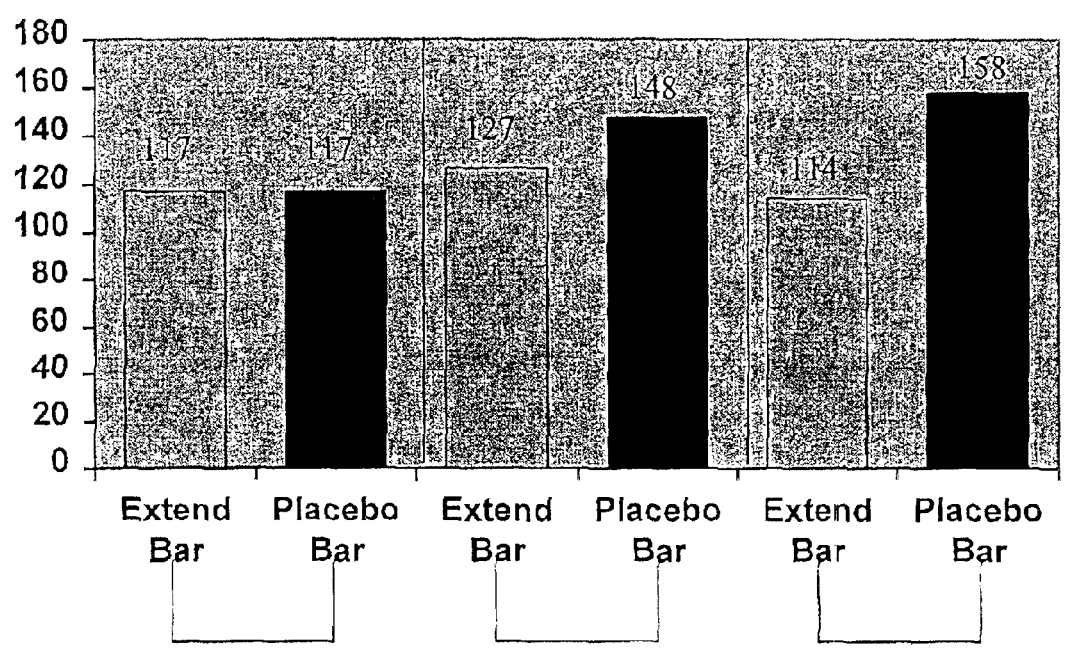
FIG. 1 is a graphical representation of a comparison between blood glucose levels (mg/dL) in patients pre-snack before bedtime, at midnight, or before breakfast, with administration of Extend Bar® (left bar) or a placebo (right bar).

The present invention will now be described with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. All publications, patent applications, patents, and other references mentioned herein are incorporated by reference in their entirety.

The present invention provides a food composition for administration to patients with Type 2 diabetes to help maintain proper blood glucose regulation and to prevent wide fluctuations therein, namely, hypoglycemic and/or hyperglycemic episodes. In addition, the food composition may be administered to regulate blood insulin concentrations, e.g., to reduce the incidence or severity of hyperinsulinemic episodes and/or to prevent fluctuations in blood insulin concentrations. The therapeutic composition may be administered as part of an overall program of treatment for Type 2 diabetes, including control of diet, insulin administration, and/or other medications (e.g., oral hypoglycemic agents) in appropriate cases.

As another aspect, the present invention provides a food composition that may be administered to suppress appetite in a patient with Type 2 diabetes, who is in need or desirous thereof. While not wishing to be limited by any particular theory of the invention, it appears that the appetite suppressing effects of the inventive food compositions are attributable, at least in part, to three factors: (1) slow absorption of the food composition from the gastrointestinal tract, (2) low glycemic index of the food composition, and (3) stabilization in blood glucose and insulin levels (i.e., reduction in fluctuations in blood glucose and insulin concentrations) following ingestion of the food composition. Accordingly, the food compositions provided herein may be advantageously employed as part of a weight control regimen for patients with Type 2 diabetes mellitus.

The term "complex carbohydrates" as used herein refers to macromolecular carbohydrates including starches, polydextrose and other polysaccharides.

The term "sweetening agent" refers to simple sugars (e.g., sucrose, lactose, galactose and fructose), sugar alcohols used as sweeteners (e.g., sorbitol or maltitol) and artificial sweeteners (e.g., aspartame, sodium saccharin and acesulfame potassium).

The term "nutrients" as used herein refers to macronutrients such as carbohydrates, proteins and fats.

1. Food compositions.

In general, a food composition used to carry out the present invention typically comprises:

a) a complex carbohydrate that is slowly absorbed from the human gastrointestinal tract (hereinafter "slowly absorbed complex carbohydrate"), i.e., is slowly digested and is not completely metabolized even after 3–4 hours;

b) optionally, but preferably, a complex carbohydrate that is more rapidly absorbed from the digestive tract (i.e., is essentially completely metabolized after 3–4 hours; hereinafter "rapidly absorbed complex carbohydrate");

c) optionally, but preferably, protein;

d) optionally, but preferably, fat; and e) optionally, but preferably, at least one sweetening agent.

Food compositions that may be used to carry out the present invention are described in greater detail below. In general, food compositions that may be used to carry out the present invention include those described in U.S. Pat. Nos. 5,843,921 and 5,605,893 to Kaufman, subject to the proviso that the food composition may contain simple sugars, and further it is not critical that the amount of simple sugars other than fructose in the composition be less than about 3 grams per unit. Food compositions that may be used to carry out the present invention further include those described in U.S. Pat. No. 5,866,555 to Bell et al. and U.S. Pat. No. 5,902,797 to Bell et al., taking note that the complex carbohydrate is therein indicated as preferably a slowly absorbed complex carbohydrate, uncooked cornstarch, as described in U.S. Pat. No. 5,843,921 to Kaufman.

The ingredients in the food composition may include any conventional food ingredients of adequate purity and wholesomeness that preferably supply the desired amounts of total calories and percentage of calories from carbohydrates, protein and fat, respectively, and wherein the relative weight ranges of slowly absorbed carbohydrates, rapidly absorbed carbohydrates, protein, fat and simple sugars are as indicated herein.

In one particular embodiment, the food composition preferably contains about 20 to about 50 grams of nutrients per serving or unit (e.g., per bar), including: about 15–35 grams of total carbohydrates (about 5–15 grams of slowly absorbed complex carbohydrate, about 7–20 grams of rapidly absorbed complex carbohydrate and about 0–25 grams (preferably, about 0–15 grams) of simple sugar, sugar alcohol, artificial sweetener, or combination thereof); about 3–20 grams of protein; and about 2–7 grams of fat. Preferably, the bar contains less than about 10 grams of simple sugar other than fructose. More preferably, the bar contains less than about 3 grams of simple sugar other than fructose.

In a further embodiment, the food composition preferably provides about 100–230 calories per serving or unit, of which: about 50–75% are from slowly absorbed and rapidly absorbed complex carbohydrates; about 10–25% are from protein; and about 10–25% are from fat.

Uncooked cornstarch is the preferred source of slowly absorbed carbohydrate for purposes of the invention since its carbohydrate content and its rate of metabolism are known and are relatively uniform, and it may be readily formulated into a variety of palatable food compositions. Other possible sources of slowly absorbed carbohydrate are known in the art and include guar gum, pectin, resistant starch, and the like.

The food composition containing the foregoing components may be in any conventional "snack" form, e.g., bars, puddings, cookies, wafers, milkshakes, gels and the like, contained within a suitable package such as a bottle, can or wrapper. The food composition may be an extruded, non-baked food product. Snack-type bars resembling candy or granola bars, or rapidly consumable packaged gels, are most convenient for storage, handling and administration purposes and, when produced with scores, perforations or grooves thereon, can be easily divided for purposes of administering a fraction of a bar where appropriate. Gels may be provided as an essentially homogeneous composition in a squeezable consumable package like a tooth-paste container to be squeezed directly from the package into the mouth for consumption.

The food composition may have a weight of 10 to 200 grams, depending upon the manner of packaging and intended manner of administration. As noted above, the composition may be designed with scores or the like to divide the composition for administration, or the composition may be administered in two or more units of the discrete products.

In the preferred embodiment of a snack-type bar, the ingredients may include, by way of illustration, uncooked cornstarch as the slowly absorbed carbohydrate; polydextrose, peanuts, peanut derivatives (e.g., peanut butter), other nuts or nut derivatives as sources of rapidly absorbed carbohydrates, fat and protein; and other protein sources such as soy protein, whey protein, and casein hydrolysate. Artificial sweeteners (e.g., aspartame or saccharin) may be included in the food composition. Fructose and/or sugar alcohols such as sorbitol and maltitol (e.g., 3–15 grams) are typically the principal sweeteners. Simple sugars (e.g., fructose, sucrose, lactose or galactose) may also be included (preferably, less than about 3 grams, of simple sugars other than fructose), provided that the total nutrient and calorie profile of the finished bar comes within the parameters defined herein. Coloring agents, water, salt, preservatives and other standard ingredients or additives normally used in the preparation of a snack or candy-type bar may be utilized.

2. Methods of treatment.

Subjects that may be treated by the methods described herein are typically human subjects. The subjects may be normal subjects (that is, patients not afflicted with diabetes) or may be subjects afflicted with diabetes (e.g., Type 1 or Type 2 diabetes, preferably Type 2). The subjects may be of any age, including neonatal, juvenile, adolescent and adult (including the elderly), with the dosage or amount of the food composition administered adjusted appropriately.

The food compositions disclosed herein may be administered to reduce or prevent the incidence of hypoglycemic and/or hyperglycemic episodes in Type 2 diabetic patients. The present invention further provides methods of administering a food composition, as disclosed herein, to reduce fluctuations in blood glucose levels outside of the normal range (i.e., 60–250 mg/dL).

The present invention may be used to suppress appetite in a subject in need thereof. Such subjects may include obese patients, in particular, patients with Type 2 diabetes in whom weight loss is a part of the diabetes treatment plan.

The composition is typically administered in an amount ranging from 10 to 200 grams per serving, depending upon the age, weight and condition of the subject. One, 2, 3, or even 4 or more servings may be administered per day, again depending upon the condition of the subject and the purpose of the treatment. For example, where used to suppress appetite, the composition may be administered as a meal replacement or as a before-meal or between-meal snack.

Many diabetics routinely consume a bedtime snack containing about 30 grams of carbohydrate, often in the form of bread, cereal or milk. By the method of treatment of the present invention, patients suffering from diabetes mellitus (preferably Type 2) are administered in place of, or as part of, their normal evening or pre-bedtime snack (in accordance with their recommended bread and protein exchanges) one to two servings or units of the therapeutic food composition, for example one to two bars prepared in accordance with the invention. The number of units administered, including fractions of a unit (such as half bars), will depend on the age, weight and condition of the patient, whether or not the patient takes insulin or other antidiabetic medication and the patient's nocturnal blood sugar profile as determined by finger stick blood glucose levels or other means of blood sugar management. The goal of the treatment is to prevent blood glucose levels from dropping below 60 mg/dl, defined as hypoglycemia, while not rising above 250 mg/dl, defined as hyperglycemia (i.e., to reduce or prevent wide fluctuations in blood glucose levels). Alternatively stated, the food composition is administered to maintain blood glucose levels within the normal range.

Dosage amounts of less than one unit may be utilized in younger pediatric patients or in patients who have demonstrated relatively little tendency towards nocturnal hypoglycemic events.

Patients may also be treated during the day with doses of the novel food composition, which may be slowly metabolized to the monosaccharide glucose over a period of six to eight hours, instead of receiving primarily simple carbohydrates such as are contained in orange juice or other sugar sources that tend to cause a rapid peak in blood glucose level which subsides quickly.

During waking hours the patient's use of, and hence requirement for, glucose is varied and depends upon the level and type of activity, e.g., vigorous exercise. The exact amount and frequency of the actual dose, therefore, will vary by patient and from day to day for each patient. A blood glucose test, usually administered as a finger stick to obtain a blood sample, can be used to monitor daily glucose levels as well as the patient's own subjective experience of symptoms associated with the onset of hypoglycemia. Therefore, in the practice of this invention sufficient complex carbohydrate is administered in the form of the novel food composition to maintain the blood glucose level somewhat above this level, nominally about 60 mg/dl in the average patient.

It will be appreciated by persons of skill in the medical arts generally and in the management of diabetic patients specifically that the composition and method of the present invention are valuable adjuncts to conventional diet management and drug or insulin therapy and can provide an easily administered and accepted modality to avoid excessive peaks and valleys in blood glucose levels, particularly the severe hypoglycemic episodes which are experienced by many diabetics.

The present invention is illustrated in greater detail in the following non-limiting Examples.

EXAMPLE 1

Materials and Methods

Twenty-eight subjects (11 men and 17 women) with Type 2 diabetes followed in Casa Pacifica Medical Clinic in Ventura, Calif. were chosen for this study after informed consent was obtained. The mean age of the subjects was 61.9±14.5 years (range 23–78 years), the mean diabetes duration was 49.7±53.6 months (range 2 months–20 years) and the mean HbA1c was 8.27±1.3% (range 6.7–10.8%). There were 13 subjects treated with oral agents, 8 with insulin, and 7 with combination therapy. They routinely had a pre-bedtime snack.

The 28 study subjects with Type 2 diabetes were randomly assigned to ingest Extend Bar® for 3 evenings followed by a placebo bar for 3 evenings, or vice versa. The content of the two 160 Kcal bars are given in Table 1. The subjects were blinded as to the type of bar they ingested and were instructed to follow their regular diabetes routine during the study period, including having a usual dinner on all study nights. Pre-snack before bedtime, midnight and before breakfast finger stick blood glucose levels were obtained with the patient's home glucose meter and results were recorded by the subject on a data sheet. Results from these determinations were compared to determine the incidence of hypoglycemia (number of glucose readings <60 mg/dL), hyperglycemia (number of glucose readings >250 mg/dL), and to calculate any differences in the group's mean blood glucose levels at the 3 evaluation times when ingesting the cornstarch snack bar versus the placebo bar. Statistical analysis was done with student's t-test.

TABLE 1

Content of Extend Bar ® versus the Placebo Bar

|  | Extend Bar ® | Placebo Bar |
| --- | --- | --- |
| Calories | 160 | 160 |
| Total Carbohydrate | 31 g | 31 g |
| Uncooked cornstarch | 5 g | 0 g |
| Protein | 3 g | 3 g |
| Total Fat | 3 g | 3 g |
| Monounsaturated Fat | 1 g | 1 g |
| Saturated Fat | 1.5 g | 1.5 g |
| Cholesterol | 0 mg | 0 mg |

Ingredients: Rice flour, chocolate chips (maltitol, unsweetened chocolate, cocoa butter, soy lecithin, natural flavor), fructose, maltitol syrup, cornstarch (Extend Bar® only), soy protein isolate, rice bran, honey, soybean oil, malt, salt, natural flavor.

EXAMPLE 2

Results

There were no episodes of hypoglycemia or hyperglycemia pre-snack before bedtime, at midnight or before breakfast during the study period. As shown in FIG. 1, the mean blood glucose levels pre-snack at bedtime were nearly identical. However, the mean blood glucose levels were significantly lower at midnight and before breakfast on the nights that the Extend Bar® was ingested compared to the placebo bar. There were no significant differences in blood glucose levels by type of diabetes treatment regimen. The bars were well tolerated with no episodes of gastrointestinal side effects.

These data indicate that adult subjects with Type 2 diabetes had significant reduction in midnight and fasting blood glucose levels on the nights that the Extend Bar®, containing uncooked cornstarch, was ingested compared to a placebo bar of equal carbohydrate, protein and fat content but without uncooked cornstarch. This occurred regardless of the treatment regimen followed, with subjects on oral agents, insulin and both showing reduction in fasting and midnight blood glucose levels. Ingestion of Extend Bar® as the nighttime snack before bed may be an effective strategy to reduce the frequency of nocturnal and morning hyperglycemia in subjects with Type 2 diabetes without increasing the risk of hypoglycemic events.

Uncooked cornstarch is a complex carbohydrate composed of approximately 27% of the linear chain dextrose polymer amylose and 73% of the branched chain dextrose polymer amylopectin (Kaufman et al., (1997) Diabetes Res. Clin. Pract. 35:27). Uncooked cornstarch is converted into maltose and other very small glucose polymers in the small intestine by the hydrolytic effect of pancreatic amylase. Intestinal epithelial enzymes allow for further hydrolysis and the slow absorption that occurs into the portal circulation over at least a 6 hour period (Lozano et al., (1990) Am. J. Clin. Nutr. 52: 667).

While not wishing to be held to any particular theory of the invention, as a result of this slow hydrolysis and absorption, and perhaps as a result of mixing the carbohydrate with fat and protein (Kaufman et al., (1997) Diabetes Res. Clin. Pract. 35:27), glucose entry into the blood stream may be delayed even further, extending over a 6 hour period. This may help avoid extremes of glycemic excursion and reduces hyperglycemic and hypoglycemic episodes.

Ingestion of the Extend Bar® resulted in a significant decrease in fasting blood glucose levels. Reduction in fasting glycemia is the goal of the intensive management of Type 2 diabetes. As outlined in the algorithms developed by the UKPDS (UKPDS Group (1998) Lancet 352: 837), the goal of therapy for Type 2 diabetes is to achieve a fasting glucose level between 110–120 mg/dL. This goal was achieved in this study for the subjects when they ingested Extend Bar®. These results indicate that Extend Bar® is a useful adjunct to the diabetes regimen for subjects with Type 2 diabetes on insulin, oral agents, or both wishing to eat a snack before bedtime.

EXAMPLE 3

Appetite Suppression

There are several lines of evidence indicating that the Extend Bar® carbohydrate snack bar has an effect on appetite suppression:

1. Studies done in subjects with Type 1 diabetes show that there is a prolonged action of the Extend Bar® carbohydrate snack bar. It is effective in the body for up to 8–9 hours to decrease episodes of hypoglycemia (without increasing episodes of hyperglycemia). These results indicate that the Extend Bar® carbohydrate snack bar, through its slow absorption from the gastrointestinal tract, extends the effect of its 160 calories over a prolonged time period. In addition, Extend Bar® carbohydrate snack bar has now been shown to stabilize blood glucose levels in subjects with Type 2 diabetes. Blood glucose levels at midnight and before breakfast are statistically lower in patients with Type 2 diabetes after Extend Bar® carbohydrate snack bar as compared with a snack of equal calories. Again, these results indicate that there is slow absorption of Extend Bar® carbohydrate snack bar in the gastrointestinal tract.

2. Extend Bar® carbohydrate snack bar has an extremely low glycemic index. Foods with a low glycemic index have been shown to be appetite suppressants. These foods do not cause a rapid increase in glucose entry into the body since they are digested and absorbed slowly. They also do not cause the peaks and valleys of blood glucose levels that are known to adversely affect and stimulate appetite.

3. In a study in normal subjects, the Extend Bar® carbohydrate snack bar formula has been shown to cause a slower rise, a decrease in peak value, and a more gradual decrease in blood glucose and insulin levels when compared with other bars. Ten normal subjects ingested 75 grams of carbohydrate in the form of 2.5 snack bars (Extend Bar® carbohydrate snack bar formula versus a placebo bar of equal total carbohydrate, fat, protein, and calorie content). Detailed analysis of the data showed that there was a significant decrease in the insulin peak at 30 and 120 minutes with Extend Bar® carbohydrate snack bar versus the placebo Bar. There was no difference in the area under the curve for insulin levels between these two bars showing that there was an equivalent amount of carbohydrate absorbed, but with a different time frame of absorption. There was also a higher blood glucose peak with the placebo bar versus the Extend Bar® carbohydrate snack bar at 30 minutes indicating a more rapid absorption of the placebo bar carbohydrate content. The reverse was found at 300 minutes, when the blood glucose level was statistically higher at 300 minutes with the Extend Bar® carbohydrate snack bar. This showed that there was a delay in absorption of the nutrients in the Extend Bar® carbohydrate snack bar. Since peaking of insulin followed by its fall in serum concentration has been shown to stimulate appetite, the failure of the insulin level to peak with Extend Bar® carbohydrate snack bar indicates that it will help control appetite.

EXAMPLE 4

Appetite Suppression in Healthy Subjects

Criteria.

This prospective study did not enroll participants at random. Several strict criteria were adhered to in order to complete the evaluation. To be considered for the study, volunteer patients had to be between the ages of 18 and 50, although either males or females were acceptable. Furthermore, their Body Mass Index (BMI) had to be between 27 and 31 at the time of the study period. BMI was calculated by the following formula:

1) multiply weight in pounds by 703
2) multiply height in inches by height in inches
3) divide the answer in step 1 by the answer in step 2 to obtain BMI Exclusionary criteria were important for patient safety and management. No pregnant or lactating women were allowed to participate. Any history of significant endocrinology disorder such as Type 1 or Type 2 diabetes, hypo- or hyperthyroidism, adrenal disorder, or pituitary disease resulted in exclusion. Also, any stated history of eating disorder, such as anorexia nervosa or bulimia warranted exclusion from the study.

Methods.

In an effort to evaluate the efficacy of Extend Bar®, 50 participants were enlisted and randomly assigned numbers to denote patient identification. Two buffet-style dinner meals on separate dates were also scheduled. For the first meal, patients 001–025 were given the placebo bar and told to eat it 3 hours prior to the buffet and fast after lunchtime. Patients 026–050 were given the active bar and instructed similarly. For the second meal, scheduled for a separate day, the patients were switched, i.e., patients 001–025 were given the active bar and patients 026–050 were given the placebo bar. Once again, the instructions regarding intake were the same. During the meal, patients were further told to eat whatever pleased them at the buffet and to consume only the amount of food that would be required to achieve satiation. Overloading of food was strongly discouraged, although unlimited returns to the buffet were allowed. All 50 participants showed for the first meal, but only 41 showed for the second meal thus necessitating the need to schedule the final 9 for the second meal again. After completing each scheduled meal, participants were given a survey as to their satisfaction of the study and to specifically rate the taste and texture of the two bars in a comparison, giving scores for the placebo and active within a range of 1 to 10, with 10 being superior. Additionally, during each meal, each patient was designated by identification number and a caloric intake value was tabulated. Caloric intake was assessed by weighing each portion of food taken prior to ingestion at each separate trip to the buffet table per individual; after consuming the food, the uneaten portions were also weighed in order to accurately assess the amount of caloric intake during the meal.

Results.

For the pool of 50 patients, the distribution between genders was 32 females and 18 males. Average height was 66.96 inches, average weight was 182.6 pounds, and the average BMI was 28.54.

Since patients were identified previously to each meal as receiving either active or placebo, it was then possible to statistically analyze the data in regards to two key components of this trial. First, taste was evaluated. With $p<0.05$ using ANOVA (single factor) and t-Test (two-sample assuming unequal variances), the taste of the placebo was rated statistically significantly better than the taste of the active. The patients rated taste for placebo averaging a score of 7.5 out of 10 for level of satisfaction as compared with active which averaged 6.08. Variance between the two series was 1.969 and 5.686 respectively. Using ANOVA, the P-value with one degree of freedom was $4.69 \times 10^{-5}$ for the differential between taste of placebo versus active, substantiating statistical significance. T-Test further asserted that the P-value was $2.51 \times 10^{-5}$, also statistically significant.

Assessing the caloric intake similarly, patients on placebo bar consumed an average of 879.36 calories while active bar consumption yielded a caloric intake of 697.12 calories for the meal. This corresponds to an average difference of 182.24 calories between the two groups, approximately a 21% decline in caloric intake after consuming the active product. Statistical significance was shown as above in the taste analysis. ANOVA provided a P-value of $1.014 \times 10^{-3}$ with one degree of freedom and t-test analysis supplied a P-value of $5.12 \times 10^{-4}$.

The foregoing is illustrative of the present invention, and is not to be construed as limiting thereof. Preferred embodiments of the invention are defined by the following claims, with equivalents of the claims to be included therein.

I claim:

1. A method of suppressing appetite in a patient with Type 2 diabetes, comprising administering to the subject, in an effective appetite suppressing amount, a food composition comprising:
   (a) about 10 to 75 percent by weight of slowly absorbed complex carbohydrate;
   (b) about 10 to 40 percent by weight of rapidly absorbed complex carbohydrate;
   (c) about 2 to 40 percent by weight of protein;
   (d) about 2 to 40 percent by weight of fat; and
   (e) at least one sweetening agent in an amount effective to sweeten the food composition;
   wherein said food composition suppresses appetite to a greater extent as compared with a placebo that does not contain slowly absorbed complex carbohydrate.

2. The method of claim 1, wherein the slowly absorbed complex carbohydrate is uncooked cornstarch.

3. The method of claim 1, wherein the sweetening agent includes about 10 to 60 percent by weight of a simple carbohydrate selected from the group consisting of sucrose, glucose, dextrose, and combinations thereof.

4. The method of claim 1, wherein the sweetening agent includes about 2 to 60 percent by weight of a sugar alcohol selected from the group consisting of sorbitol, maltitol, and combinations thereof.

5. The method of claim 1, wherein the sweetening agent includes about 2 to 60 percent by weight of fructose.

6. The method of claim 1, wherein the amount of simple sugars other than fructose in the composition is less than about 40 percent by weight.

7. The method of claim 1, wherein the sweetening agent is selected from the group consisting of asparatame, sodium saccharin and acesulfame potassium.

8. The method of claim 1, wherein the food composition is in the form of a snack bar, pudding, cookie, wafer, milkshake or gel.

9. The method of claim 1, wherein the food composition has a weight of 10 to 200 grams.

10. A method of suppressing appetite in a patient with Type 2 diabetes, comprising administering to said subject, in an effective appetite suppressing amount, a food composition comprising per serving or unit about 20–50 grams of nutrients including about 5–15 g of uncooked cornstarch wherein said food composition contains less than about 3 grams of simple sugars other than fructose, wherein said food composition suppresses appetite to a greater extent as compared with a placebo that does not contain slowly absorbed complex carbohydrate.

11. The method according to claim 1, wherein the patient with Type 2 diabetes is obese.

12. The method according to claim 10, wherein the patient with Type 2 diabetes is obese.

13. The method according to claim 10, wherein said food composition contains less than about 3 grams of simple sugars other than fructose.

* * * * *